United States Patent [19]

Petry, Jr. et al.

[11] 3,939,026

[45] Feb. 17, 1976

[54] PROCESS OF PREPARING A FILM STRIP FOR HANDLING

[75] Inventors: Chester H. Petry, Jr., Newberg; J. Carl Hensley, Portland, both of Oreg.

[73] Assignee: Byers Photo Equipment, Portland, Oreg.

[22] Filed: June 4, 1974

[21] Appl. No.: 476,302

Related U.S. Application Data

[62] Division of Ser. No. 291,945, Sept. 25, 1972.

[52] U.S. Cl. ............... 156/304; 156/324; 156/545; 428/61; 428/189; 428/191
[51] Int. Cl.² B32B 31/08; B32B 31/20; B65H 21/00
[58] Field of Search .......... 156/304, 324, 361, 544, 156/545, 554, 555; 161/145; 428/189, 191, 61

[56] References Cited

UNITED STATES PATENTS

| | | | |
|---|---|---|---|
| 1,012,609 | 12/1911 | Dennis .............................. | 156/545 |
| 2,997,099 | 8/1961 | Pike .................................. | 156/545 |
| 3,395,061 | 7/1968 | Covert et al. ..................... | 156/324 |
| 3,547,735 | 12/1970 | Ortel ................................ | 156/304 |
| 3,727,815 | 4/1973 | Schwartz .......................... | 156/324 |
| 3,773,598 | 11/1973 | Taeffner et al. .................. | 156/545 |
| 3,802,983 | 4/1974 | Epperson et al. ................. | 156/157 |
| 3,824,143 | 7/1974 | Cooper et al. .................... | 156/304 |

FOREIGN PATENTS OR APPLICATIONS

| | | | |
|---|---|---|---|
| 541,011 | 5/1957 | Canada ............................. | 156/545 |

*Primary Examiner*—Harold Ansher
*Assistant Examiner*—Charles E. Lipsey
*Attorney, Agent, or Firm*—Eugene M. Eckelman

[57] ABSTRACT

A tabbed film strip comprising a film portion and a tab portion secured together in parallel adjacent edge relation by a connecting tape overlapping the film and tab portion and adhesively secured thereto in an arrangement leaving a major area of the film portion and tab portion uncovered throughout their lengths. Apparatus to form this product and to carry out a process of making it comprises a housing which supports individual feed supplies for the film portion and the tab portion and which also supports a feed supply for the connecting tape. The tape has pressure sensitive adhesive on one of its surfaces for securement to the film and tab portions. Forming mechanism is supported on the housing and has guide grooves therein as well as guide rollers and a hold-down arm associated therewith arranged to place the film portion and tab portion in parallel adjacent edge relation and to secure these two portions together by means of the tape. The film portion and tab portion after leaving the forming mechanism, pass over a power driven drum which pulls the film and tab portions, as well as the tape, through the forming mechanism for the formation of the tabbed film strip. This drum is arranged to feed the completed film product to other mechanism upon demand of the latter.

2 Claims, 13 Drawing Figures

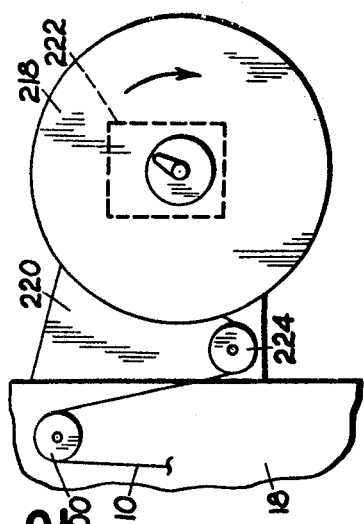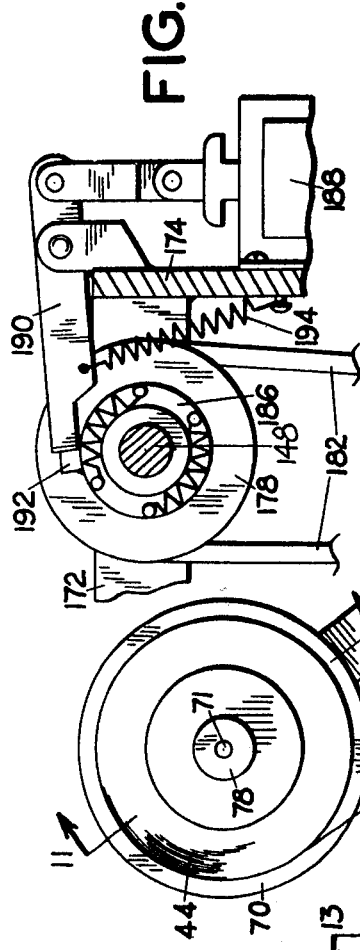

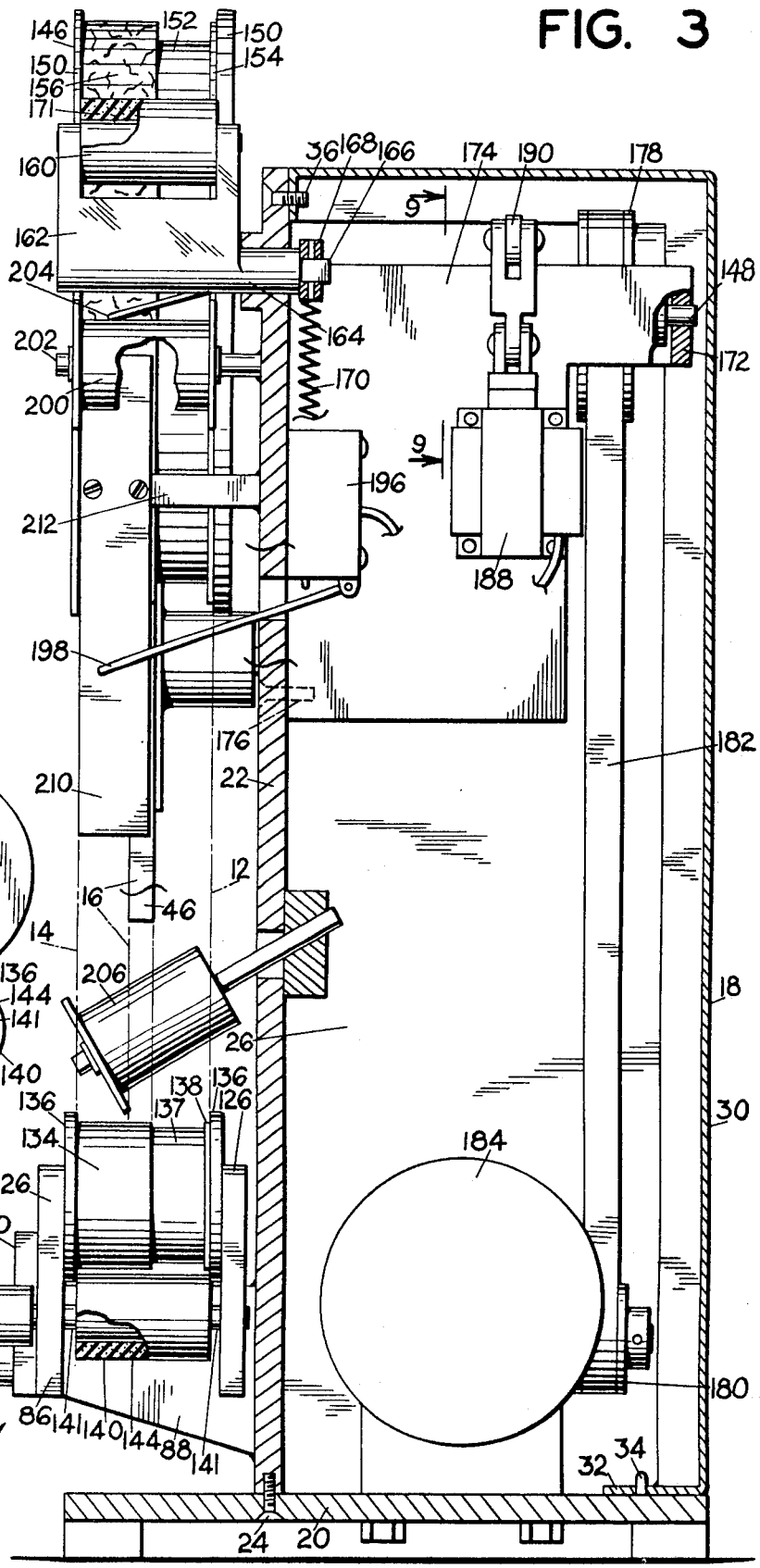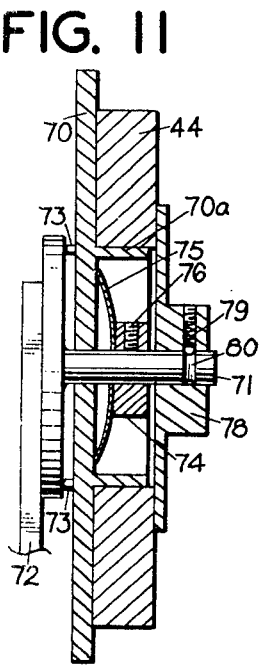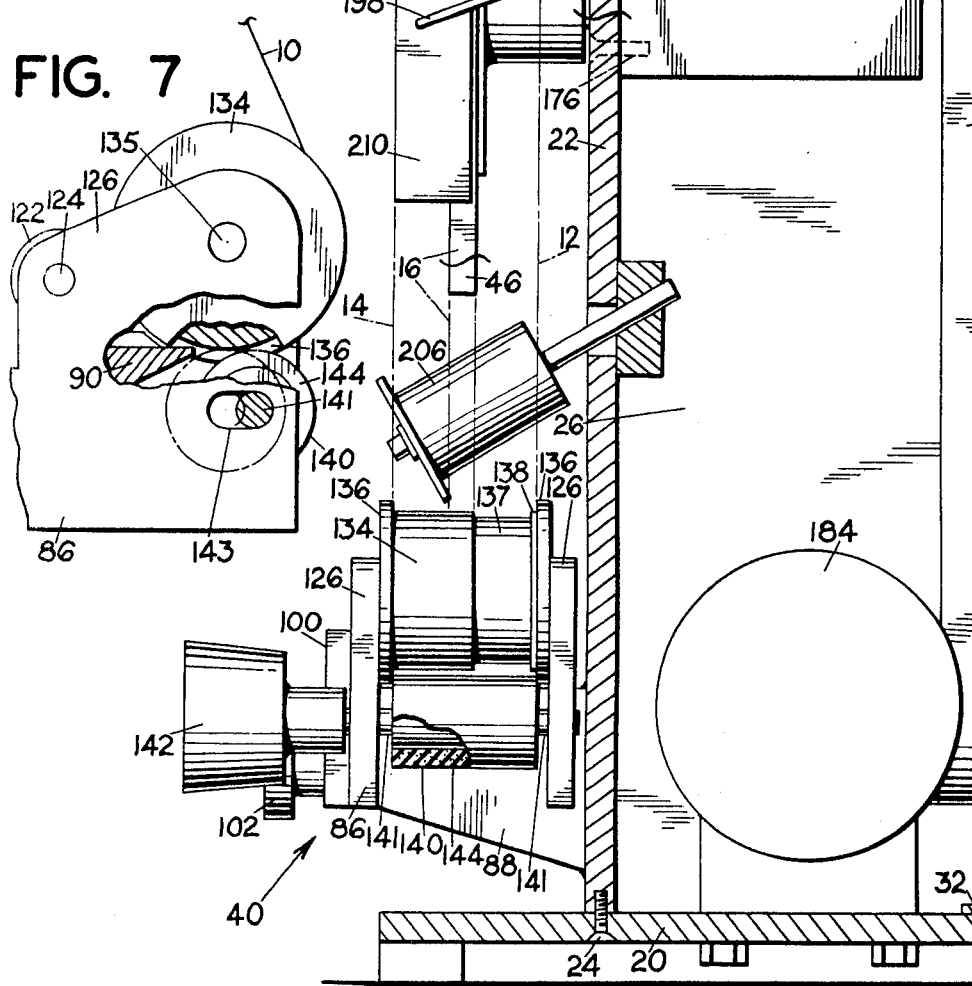

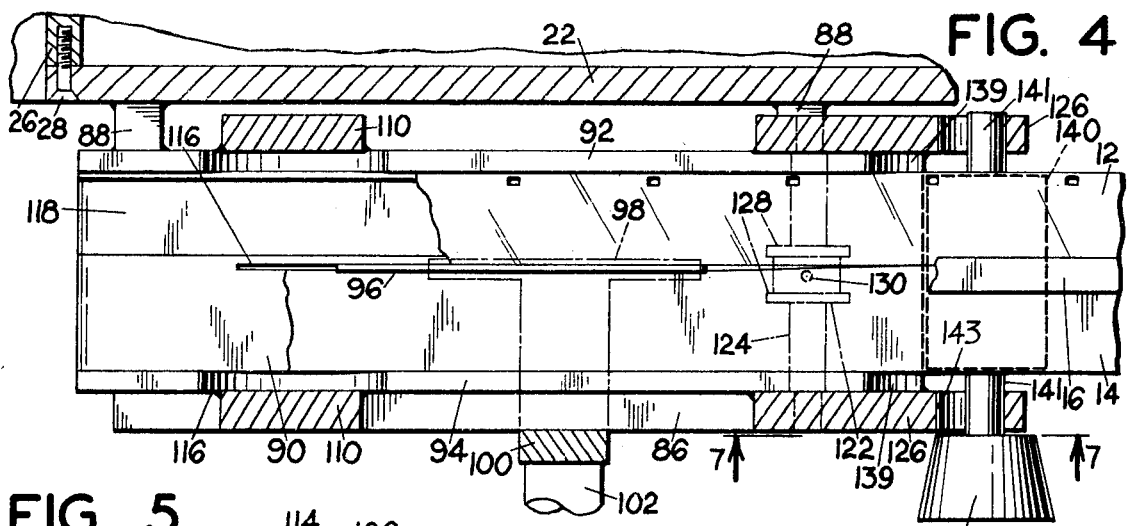
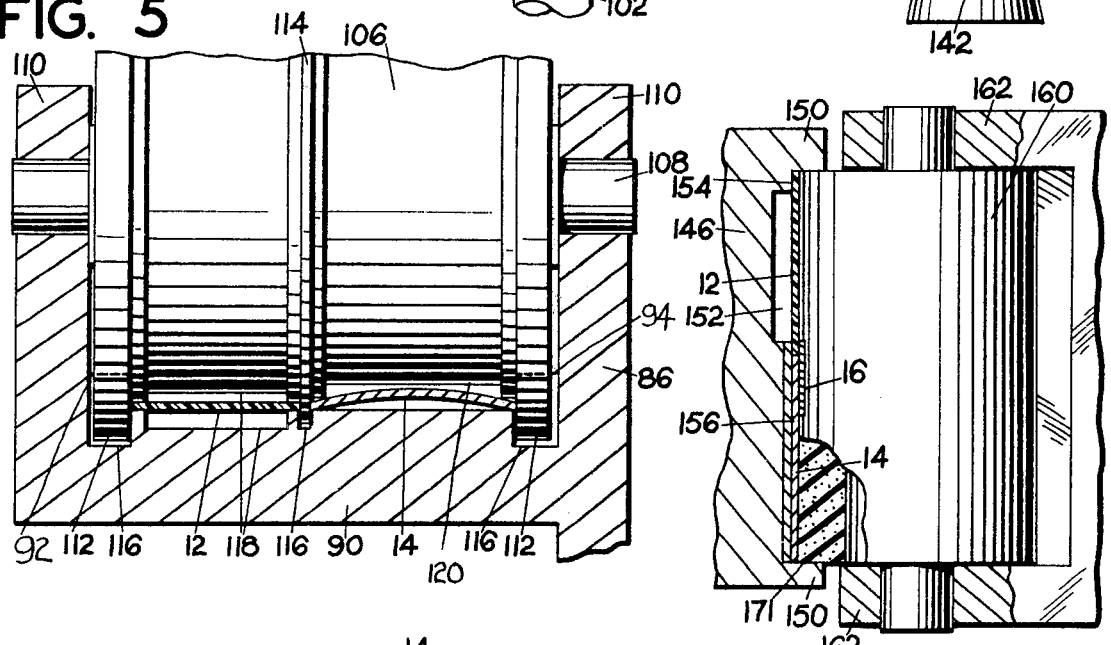
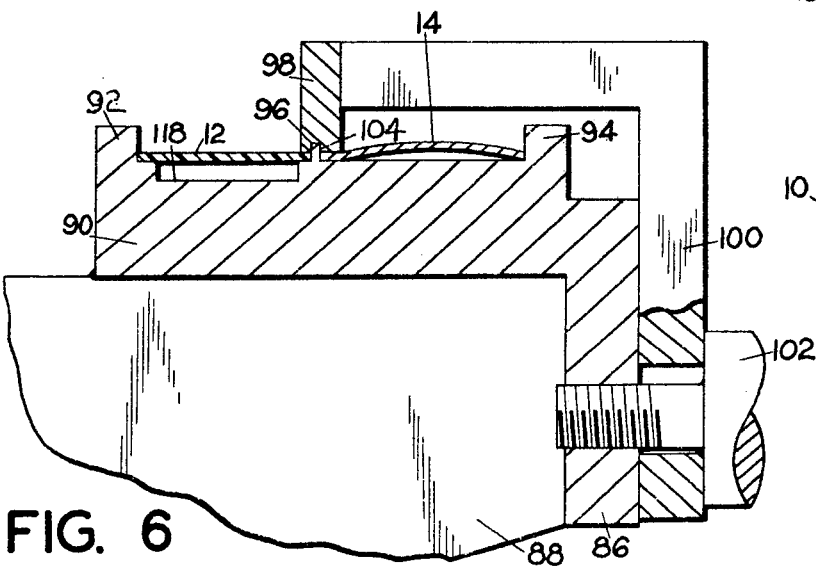
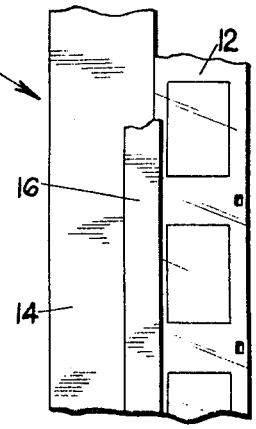

PROCESS OF PREPARING A FILM STRIP FOR HANDLING

This is a division of application Ser. No. 291,945, filed Sept. 25, 1972.

BACKGROUND OF THE INVENTION

This invention relates to a new and novel tabbed film strip product and to process and apparatus for preparing such product.

In the processing of film, it is customarily wound on reels and then moved through developers, wound up again, moved through printers and then finally cut and packaged. Some of the film, being rather narrow, is difficult to handle or treat, particularly the smaller type film presently in use. Such film, being reduced in size, also requires special machinery for its handling. According to the present invention and forming a primary objective thereof, a tabbed film strip is provided which comprises a film portion in strip form and a tab portion in strip form secured together in side by side adjacent edge relation by a tape glued in overlapping relation thereon in the area of the edges, thus providing a product which facilitates easy handling and printing for the film and which is capable of being used in most existing printing apparatuses.

Another object of the invention is to provide a novel process for forming the tabbed film strip comprising guiding a film portion in strip form and a tab portion in strip form along a surface in adjacent edge relation and at the same time feeding a tape having a glue surface onto the film portion and tab portion in the area of the adjacent edges, and compressing the tape on the film and tab portions to connect the latter together.

Another object of the invention is to provide an apparatus for carrying out the process and forming the product comprising independent feed means for each of the film portion, tab portion, and the tape, and also including a forming mechanism for receiving and positioning the two portions in adjacent edge relation and applying the tape to the two portions to form the integral product.

Other objects of the invention are to provide a novel drive arrangement for the formation of the tabbed film strip as well as for making the latter available to other apparatus, comprising a power driven drum having a friction connection with the assembled strip and arranged to pull it through the forming apparatus; to provide a novel drive for the drum wherein such drum operates only when a discharged supply therefrom is diminished; to provide a novel forming mechanism which places the film portion and the tab portion in adjacent edge relation for securement by the tape; and also to provide in the forming mechanism and pulling drum relieved areas where the film travels whereby picture areas of the film will not engage any surface.

The invention will be better understood and additional objects and advantages will become apparent from the following description which illustrates a preferred form of the device.

BRIEF DESCRIPTION OF THE DRAWINGS

FIG. 1 is a side elevational view of apparatus of the invention;

FIG. 2 is a fragmentary elevational view of a portion of the apparatus showing a modified form;

FIG. 3 is an enlarged vertical sectional view of the apparatus taken on the line 3—3 of FIG. 1;

FIGS. 4, 5 and 6 are enlarged fragmentary sectional view of forming mechanism, taken on the lines 4—4, 5—5 and 6—6 of FIG. 1, respectively.

FIG. 7 is an enlarged fragmentary elevational view of a forward portion of the forming mechanism;

FIG. 8 is an enlarged, fragmentary sectional view of tape drive means, taken on the line 8—8 of FIG. 1;

FIG. 9 is an enlarged fragmentary sectional view of control apparatus for the drive means, taken on the line 9—9 of FIG. 3;

FIG. 10 is a fragmentary sectional view of feed means for the film portion, taken on the line 10—10 of FIG. 1;

FIG. 11 is a sectional view of feed means for the tab portion, taken on the line 11—11 of FIG. 1;

FIG. 12 is an end edge view of a tabbed film strip comprising the product which forms part of the invention; and FIG. 13 is a fragmentary plan view of such product, taken on the line 13—13 of FIG. 12.

DETAILED DESCRIPTION OF A PREFERRED EMBODIMENT

Referring in particular to the drawings and first to FIGS. 12 and 13, the product of the invention, designated generally by the numeral 10, comprises a film portion 12 in strip form, a tab portion 14 also in strip form, and an attaching strip portion 16. In the formed construction of the product, the portions 12 and 14 are disposed in close side edge relation, preferably in edge abutment, and are secured together in such relationship by the strip portion 16. The strip portion 16 may comprise a conventional tape having adhesive on one surface, preferably a pressure sensitive adhesive. Such tape has a width less than the combined width of portions 12 and 14. Most of its width overlaps and is secured to the tab portion 14. The overlapping engagement with the film portion is only a small amount in order not to interfere with picture portions of the film. In most films, there is at least a margin of one thirty-second inch and it is found that such an overlap is sufficient to provide a good connection against lateral displacement so that the tab is useful in combination with the film for engagement by treating mechanism or for handling by the processor or customer. Although a good lateral connection is provided, the film portion can be readily separated from the tab portion if desired by tearing it off longitudinally, particularly if a pressure sensitive adhesive is used. The film portion 12, to which the tab portion is applied according to the present invention, comprises a length of film which has been developed but which requires further handling for return to the customer. Such film is customarily made up in long lengths and placed on rolls for this purpose.

The thickness of the tab portion 14 is substantially the same thickness as the film strip for best results. Although the tab portion 14 may be constructed of paper or any other suitable material, it preferably is formed of a plastic film, such as polyester film, so that it has somewhat the same coefficient of expansion as the film strip and thus will not wrinkle. Such a polyester film also does not absorb moisture to further reduce the possibility of wrinkling. It is desirable that one surface of the tab portion 14 be capable of receiving pencil or ink markings.

The formed product 10 has the advantage that it can be handled, namely, by the tab portion, so that the film portion is not damaged. Also, the tab portion can be marked by the processor or customer for any desired purpose.

Apparatus for making the product of the invention comprises a housing 18, FIGS. 1 and 3, having a bottom wall 20, a front wall 22 secured thereto as by screws 24, and side walls 26 also secured to the bottom wall and to the front wall, as by screws 28. A removable back and top wall section 30 is attached to the housing by locator projections 34 on the bottom wall and screws 36 extending through the front wall.

The three strip portions 12, 14 and 16 are fed to a forming mechanism 40 in the construction of the product from individual supply rolls 42, 44 and 46, respectively. Film supply roll 42 is mounted on a spool or reel 47 supported on an arm 48 in turn supported on the housing by a connection 50. Connection 50 includes a shaft support which allows the arm to be pivotally adjusted for a desired positioning of the roll 42. Also, it is preferred that the arm be removable at the connection 50 for reducing the size of the apparatus in shipment and storage. With reference to FIG. 10, spool 47 is pivotally supported on a shaft 54. A retaining knob 56 is adapted to be received on the shaft 54 and has a spring pressed retainer 58 removably engageable with a transverse surface groove 60 in the shaft to frictionally hold the knob in place which in turn holds the spool on the shaft. Preferably, the side plate of the spool adjacent to the knob 56 is freely removable from the spool whereby in order to install or remove a roll of film, it is merely necessary to remove the knob and side plate. To remove the knob, it is merely forcefully pulled off, and to install it, it is pushed inward to the point where the retainer 58 snaps into groove 60.

A roller 62 engages the periphery of spool 52 and is mounted in such position by an arm 64 having a longitudinally slidable mounted engagement on arm 48 by headed pins 66 on the latter arm slidably confined in an elongated slot 68 in the arm 64. A tension spring 69 is connected between the arm 64 and arm 48 and urges the roller 62 against the supply spool 47. Roller 62 permits rotation of the spool 47 for stripping off film but at the same time is arranged to create a drag on such rotation for a purpose to be described hereinafter.

Tab supply roll 44 is removably supported on a single flange reel 70, FIGS. 1 and 11, rotatably mounted on a shaft 71 projecting from an arm 72. Reel 70 has an open front hollow hub portion 70a for removably supporting the roll 44. Arm 72 has a pivotally adjustable and removable connection to the housing similar to arm 48. The rear side of reel 70 has friction members 73 supported thereon bearing against the arm 72. These friction members produce a drag on the rotation of the reel 70, and such drag is adjustable by means which hold the reel on the shaft, comprising a collar 74 on the shaft within the hub and a spring washer 75 disposed between the collar and the reel. The collar is held on the shaft by a setscrew 76, and by selectively locating such collar against the washer, the tension applied between the arm 72 and the friction members 73 can be varied to control the drag on the rotation of reel 70. Such drag may be desirable to prevent overrunning of the reel 70 when a pull on the tab 14 is stopped abruptly.

The supply roll 44 is retained on the hub 70a by a removable flanged knob 78. This knob has a spring pressed retainer 79 removably engageable with a transverse groove 80 in the shaft for readily installing and removing the knob. A new roll 44 is readily installed on the reel 70 by merely removing the knob 78.

Tape supply roll 46 is mounted on a shaft 82 supported on the front wall 22 of the housing. Such roll is held on the shaft by a flanged knob 84 removably mounted on the shaft as are the knobs 56 and 78. The tape roll does not require mounting on a reel nor does it require any friction drag due to the slight coherence between layers of the tape on the roll.

The three strips 12, 14 and 16 are formed into the final product 10 by the forming mechanism 40. This mechanism comprises an outer vertical side wall 86, FIGS. 1, 4, 5, 6 and 7, secured to end mounting arms 88 on the front wall 22 of the housing. Forming mechanism 40 has a top wall 90 with longitudinal side guide rails 92 and 94 extending substantially the full length of the top wall. A parting rib 96, FIGS. 4 and 6, extends through a portion of the length of the top wall 90 intermediate the ends thereof parallel with and between the rails 92 and 94. The spacing between the rail 92 and the rib 96 is substantially identical to or slightly greater than the width of the film portion 12 so that such film strip can move therebetween in a flat condition. The spacing between the rib 96 and the rail 94, however, is slightly less than the width of the tab portion 14 so that when such tab portion is moved longitudinally therebetween it will buckle slightly as shown in FIGS. 5 and 6, for a purpose to be described hereinafter.

A hold-down shoe 98, FIGS. 1, 4 and 6, fits over a portion of the parting rib 96. This shoe is supported on an arm 100 removably attached to side wall 86 by a clamp screw 102. Hold-down shoe 98 has a bottom longitudinal groove 104, FIG. 6, which receives the parting rib 96, the shoe being held such that its bottom edge is spaced above the surface of wall 90 an amount sufficient to allow the strips 12 and 14 to move freely thereunder.

With particular reference to FIGS. 1 and 5, a guide roller 106 receives the film and tab portions 12 and 14 thereunder for feeding them to the grooves formed between the outer rails 92 and 94 and the rib 96 in the top wall 90. This guide roller is rotatably supported on a shaft 108 in turn supported on end standards 110 integral with the forming table. This guide roller has side flanges 112 and a central rib 114, the spacing between such side flanges and the rib being identical to the respective spacings between the rails 92 and 94 and the parting rib 96 in the top wall 90 and the roller also being selectively aligned whereby it is arranged to feed the film and tab portions to the grooves in the top wall. Notches 116 are cut in the rails 92 and 94 for receiving the flanges 112 and rib 114 on the roller. With particular reference to FIGS. 5 and 6, the guide roller 106, as well as the top wall 90, are recessed at 118 in the area where the film portion 12 passes. Such recesses prevent contact of the film in its center picture area from contacting a wall surface and possibly being damaged. This roller may also be recessed at 120 to allow the strip 14 to buckle in the groove between rail 94 and parting rib 96.

A tape guide roller 122 is supported on a shaft 124 in turn supported in forward standards 126. Guide roller 122 has side flanges 128 as shown in phantom in FIG. 4, and is precisely located laterally to direct the tape 16 onto the portions 12 and 14 in the desired position, namely, a small overlap on the film portion 12 and a greater overlap on the tab portion 14. It is desired that roller 122 by adjustable laterally on the shaft 124 for proper positioning, and for this purpose, it is secured on the shaft by a setscrew 130.

Forward of the tape guide roller 122 is a forming roller 134 rotatable freely on a shaft 135 supported in the standards 126. With reference to FIGS. 3 and 7, this roller has side flanges 136, and it also has a peripheral recess portion 137 for protecting the film. This recess is spaced inwardly a slight amount from the one side to form a side support surface 138 for the outer edge of the film portion.

The three portions making up the tabbed strip are united as they move around a portion of the periphery of the roller 134, the film portion riding on the surface 138 and a portion of the unrecessed area of the spool and the tab portion on such unrecessed area. The tape 16 is directed into the proper overlapping position on the portions 12 and 14 with the adhesive side down by the roller 122. That is, the portions 12 and 14 feed from the top wall 90 of the forming mechanism onto the roller 134 and as they do, the tape 16 is fed from roller 122 into direct contact with the said portions on the roller 134. The positioning of the elements of the product for connection are shown in phantom in FIG. 3 and in full lines in FIG. 4. The surface of the top wall 90 at the outlet end of the forming mechanism is in substantially the same plane as the bottom surface of the forming roller for efficient feed thereto, and the side rails 92 and 94 of the forming portion are recessed at 139, FIG. 4, for receiving the flange portions 136 of the roller 134.

With reference to FIGS. 1, 3, 4 and 7, the outfeed end of the forming mechanism has a starter or feed roller 140 secured on a shaft 141 rotatably supported in the standards 126. This shaft has a hand knob 142 on one end and is supported in the standards through horizontal slots 143. The arrangement is such that the shaft 141 will normally be disposed at the forward end of the slots and the roller 140 will be disengaged from roller 134. When it is desired to rotate the forming roller 134, however, such as to feed a short length of the product therethrough, it is merely necessary for the operator to rotate the roller 140 in a forward direction and cause the latter roller to engage the forming roller. When the operator releases the knob, the feed roller 140 will automatically move to an out-of-the way position by the forward movement of the tabbed film. The feed roller 140 has a friction surface 144 for turning the forming roller.

A drive drum 146, FIGS. 1, 3 and 8, is supported on the front wall 22 of the housing for receiving the completed tabbed film from the forming roller 134. This drum is supported on a shaft 148 in the housing in a location such that the pickup side of the drum is toward the infeed end of the forming mechanism with relation to the outfeed portion of forming roller 134 so that the product 10 doubles back a considerable amount over the roller 134 to provide a good assembly of such product on the roller. The drum 146 has side flanges 150 and the body portion of the drum has a recess 152 for protecting a film portion which rolls over the drum. As in the roller 134, recess 152 is spaced a slight amount inwardly from the one side to provide a support surface 154 for the one edge of the film. The unrecessed portion has a friction surface 156 for frictionally gripping the product. Upon operation of the drum in the direction of arrow 158, FIG. 1, a pulling drive is established for pulling the two strips and the tape through the forming mechanism 40.

In addition to the friction portion 156 on drive drum 146, a drive connection is established between the drum and the product by a pressure roller 160, FIGS. 1, 3 and 8, supported on a yoke member 162 having a shaft portion 164 extending through and journaled in the front wall 22 of the housing. An inward projecting square end 166 on the shaft 164 has an arm 168 mounted thereon which extends toward the drive roll and is urged downwardly by a tension spring 170 connected between the outer end of such arm and the housing. The roller 160 forcefully bears down on the product on the drum 146 and in addition to providing a positive drive connection between the drum and the product it also insures that a seal is established between the tape and the two strip portions. This roller preferably has a friction surface 171.

The shaft 148 for the drive drum 146 is journaled in the front wall of the housing and also in an inner frame, FIGS. 3 and 9, having a rear wall portion 172 supported by a pair of side plates 174 secured to the side wall of the housing, as by screws 176. Mounted on the shaft 148 adjacent to the rearward end thereof is a pulley 178 connected to a drive pulley 180 by means of a belt 182. Pulley 180 is secured on the output shaft of an electric motor 184 bolted to the bottom wall 20 of the housing.

Incorporated in the shaft 148 between the drum 146 and pulley 178 is a friction type clutch 186 of well known construction, FIG. 9, which when released establishes a drive connection of the forward portion of the shaft 148 with the driven rearward portion of such shaft so that the drum will rotate. The operation of the clutch is controlled by a solenoid 188, also seen in FIG. 3, arranged to pivotally operate a pawl 190 having end engagement with a single tooth 192 on the clutch part which rotates with the forward portion of the shaft.

The arrangement is such that the drive motor 184 operates continuously, as does the pulley 178, and upon energization of the solenoid, the pawl 190 is pivoted clockwise as viewed in FIG. 9 and is disengaged from the tooth 192 to allow the forward shaft portion and the drive drum 146 to rotate. Return of the pawl is accomplished by a tension spring 194.

Control of the solenoid 188 is accomplished by a switch 196, FIGS. 1 and 3, in the circuit to the solenoid and having a switch arm 198 in the path of a portion of the product 10 discharged from the drum 146. More particularly, the product 10 passes over the top portion of the drum and upon discharge from the drum, it is allowed to form a loop 10a before passing over an idler roller 200 supported rotatably on an outwardly projecting shaft 202 secured to the front wall of the housing. A spring finger 204, secured at one end to the front wall of the housing, rests on the product with sufficient tension to hold it on the roller but allowing free movement of the product over the roller. From the roller 200 the product passes under an angled guide roller 206 mounted on the front wall of the housing. The product leads from the roller 206 to additional treating mechanism 208 such as a cutter of known construction.

A stripping finger 210 is supported vertically on a support arm 212 secured to the front wall of the housing and has its upper end closely associated with the drive drum at a point where it is desired that the product leave the drum. This finger insures that the product will not follow the contour of the drum too far around and preferably has a tapered upper end 214 providing close association with the drum.

With reference to FIG. 1, the switch arm 198 is positioned selectively so as to be in the path of the loop 10a and to be engaged by said loop as the latter comes up or in other words reduces in size. Therefore, as the cutter 208 pulls the product from rolls 200 and 206 and reduces the size of the loop 10a, the bottom of the loop will engage and raise the switch arm to close the switch 196. Closing of the switch 196 operates the solenoid 198 which in turn disengages the pawl 190 from the tooth 192. This allows the clutch to drive the forward portion of the shaft and the drum 146. The drum will thus turn to construct more product and enlarge the loop 10a to its original shape for providing an additional supply for the cutter. The instant that the drive drum 146 is initiated in its rotation the loop 10a will begin to enlarge and the switch arm 198 therefore will drop. Such deenergizes the solenoid, and the pawl 190 will be pivoted back down into the path of the dog 192. Such takes place almost instantaneously and the drum thus makes only one revolution upon each demand from the cutter. Thus, even though the cutter operates continuously, the drum 146 operates only on demand, the speed at which the drum 146 is capable of furnishing the product of course being greater than the takeup speed of the cutter. This arrangement is such that a supply of the product is furnished to the cutter without the latter having to apply any pulling force to form the product.

FIG. 2 shows a modified structure wherein the output of the product beyond the idle roller 200 is fed to storage rather than to a cutter. Such storage comprises reel 218 supported on a bracket 220 secured to housing 18. Reel 218 has a drive motor 222 providing constant rotation thereof. The product 10 passes over the idle roller 200 as in FIG. 1 so that a loop as before is formed. The product then passes around the under side of a lower guide roller 224 and from there it is wound on reel 218. The furnishing of the supply from the drum 146 is the same as in FIG. 1, in that as the reel 218 takes up the loop 10a to a selected point, the drive drum 146 will operate through one revolution to enlarge the loop.

According to the present invention, a product is provided as well as a process and apparatus for making it wherein a tab strip is secured in longitudinal edge relation to a film strip and these two strips are held securely together by a connecting tape. The precise longitudinal edge relation of the two portions 12 and 14 as secured together is accomplished by the novel structure of the forming mechanism. More particularly, the two portions are guided into their respective longitudinal areas on top wall 90 between the rails 92 and 94 and the parting rib 96 by the guide roller 106. As stated hereinbefore, the tab portion 14 is buckled as it moves between the rail 94 and parting rib 96. As said portion leaves the parting rib, it flattens out whereby such lateral expansion thereof brings the one edge into close, preferably abutting, relation with the adjacent edge of the film portion 12. This method of handling the two portions has been found to position them for precise longitudinal edge to edge relation without variation and without buckling or overlap. These portions pass onto the forming roller 134 in their precise edge to edge relation and are secured together in such relation by the strip 16 as they move around the portion of the roller.

Formation of the tape in the forming mechanism 40 is accomplished by the pulling force from drum 146. Thus, not only is the tape pulled through forming means but the tension applied thereto provides a good connection of the tape to the two portions 12 and 14. The drag on film reel 47 by the tension roller 62 may be varied by selected force of spring 69 to provide the tension desired for forming the product. The apparatus for forming this product is simplified and foolproof in operation and not only has the advantage that it forms a well integrated product but it also furnishes the completed product to additional treating mechanism without the requirement that the latter exert any force to form the product. It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. The process of preparing a film strip for handling comprising simultaneously supplying a strip of film and a tab strip of approximately the same thickness from roll sources in longitudinal parallel edge relation on a longitudinal surface between longitudinal side rails and with adjacent edges of said strips disposed on opposite sides of a dividing projection which is of less length than the longitudinal surface and which is spaced from one of the side rails on the side that is to receive the tab strip a lesser distance than the width of the tab strip to cause the latter to buckle laterally when received therein, whereby as said strip portions pass beyond said dividing projection the buckled tab strip straightens out and expands laterally so as to be in adjacent edge relation and in the same plane as the film strip as aforesaid, then supplying from a rolled source a connecting strip having a pressure sensitive surface on one side thereof in overlapping relation on said strips along said adjacent edges, and then pulling the three strips partly around a roller to compress the connecting strip onto said tab and film strips and to secure the pressure sensitive adhesive to the two strips.

2. The process of claim 1 including the further step of pressure rolling said connecting strip onto said other two strips.

* * * * *